(12) United States Patent
Shiroma et al.

(10) Patent No.: US 7,981,556 B2
(45) Date of Patent: Jul. 19, 2011

(54) THERMAL MANAGEMENT SYSTEM FOR REGENERATIVE FUEL CELLS AND METHOD THEREOF

(75) Inventors: Iris Liane Shiroma, Rocky Hill, CT (US); Mark Andrew Lillis, South Windsor, CT (US); Dean Edwin Halter, West Hartford, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 1410 days.

(21) Appl. No.: 11/246,997

(22) Filed: Oct. 7, 2005

(65) Prior Publication Data
US 2007/0082239 A1    Apr. 12, 2007

(51) Int. Cl.
*H01M 8/04*    (2006.01)
(52) U.S. Cl. .................... 429/437; 429/418
(58) Field of Classification Search .......... 429/24, 429/26
See application file for complete search history.

(56) References Cited

U.S. PATENT DOCUMENTS

| | | | |
|---|---|---|---|
| 6,248,462 B1 | 6/2001 | Bonville | |
| 6,406,808 B1 | 6/2002 | Pratt | |
| 7,033,689 B2 * | 4/2006 | Iio | 429/25 |
| 2003/0044662 A1 | 3/2003 | Walsh | |
| 2003/0077491 A1 * | 4/2003 | Lillis | 429/22 |
| 2003/0087139 A1 | 5/2003 | White | |
| 2004/0108148 A1 | 6/2004 | Vanderwees | |
| 2004/0219407 A1 | 11/2004 | Molter | |
| 2005/0100769 A1 | 5/2005 | Acker | |
| 2005/0129996 A1 * | 6/2005 | Moulthrop et al. | 429/17 |
| 2005/0199192 A1 | 9/2005 | Goebel | |

* cited by examiner

*Primary Examiner* — Ula C Ruddock
*Assistant Examiner* — Stephen Yanchuk
(74) *Attorney, Agent, or Firm* — Cantor Colburn LLP (57) ABSTRACT

A regenerative fuel cell power system has a plurality of fuel cell power modules, a plurality of electrolysis modules, a water management system and a master controller. The master controller manages the temperature within the electrolysis system to prevent freezing through circulation of water from the water management system.

10 Claims, 6 Drawing Sheets

THERMAL MANAGEMENT SYSTEM FOR REGENERATIVE FUEL CELLS AND METHOD THEREOF

FIELD OF THE INVENTION

This disclosure relates generally to the operation and control of a regenerative fuel cell power system, and more particularly to systems and methods for providing thermal management of the regenerative fuel cell to prevent freezing of electrochemical cell systems.

BACKGROUND

This disclosure relates generally to the operation and control of a power system, and more particularly to a communication and control arrangement in a modular power system for providing a reliable and autonomously controlled power system.

Discrete distributed power systems are used or contemplated for use in numerous applications, including primary, backup or peak-shaving power for high value commercial equipment such as telecommunications infrastructure, primary or backup power to commercial and residential buildings, and primary or backup power to renewable energy sources for use in non-ground-based systems such as a high altitude airship, for example. A typical primary power system may include a power source such as a diesel or gasoline powered generator, a fuel storage tank, and a set of batteries to store energy, for example. A typical renewable energy source may include Photovoltaic (PV) arrays, for example. While existing power systems are suitable for their intended purposes, there still remains a need for improvements for applications where the power systems operate in a cold environment. In particular, a need exists for a power system with appropriate safeguards that will enable it to operate autonomously and reliably for extended periods of time in cold weather while minimizing the need for auxiliary heat sources.

SUMMARY OF THE INVENTION

An embodiment of the invention includes a regenerative fuel cell power system having a plurality of fuel cell power modules, a plurality of electrolyzer modules, a water management system and a master controller. Each fuel cell power module includes a fuel cell for generating electrical power, and a condenser for recapturing water and latent heat from the fuel cell operation. The master controller includes means for circulating water from the water management system into the electrolyzer modules allowing heat captured from the fuel cells to be transferred to the electrolyzer module during cold weather operation.

Another embodiment of the invention includes a method of controlling a regenerative fuel cell power system having a fuel cell power modules, an electrolyzer module and a water management system. Heat is transferred from the fuel cell module to the water management system. Heat is transferred from the water management system to the electrolyzer module and circulated through the electrolyzer cell stack.

BRIEF DESCRIPTION OF THE DRAWINGS

Referring now to the drawings wherein like elements are numbered and/or labeled alike in several Figures:

FIG. 5 depicts

FIG. 6 depicts

DETAILED DESCRIPTION

Embodiments of the invention provide a method and apparatus for providing thermal management in a regenerative fuel cell power system through collection heat and selective redistribution of the heat utilizing the circulation of water within the system, wherein the electrochemical electrolysis cell stack is maintained at a temperature above freezing thereby providing a reliable and autonomously controlled power system for use in cold climates.

Figure 1:
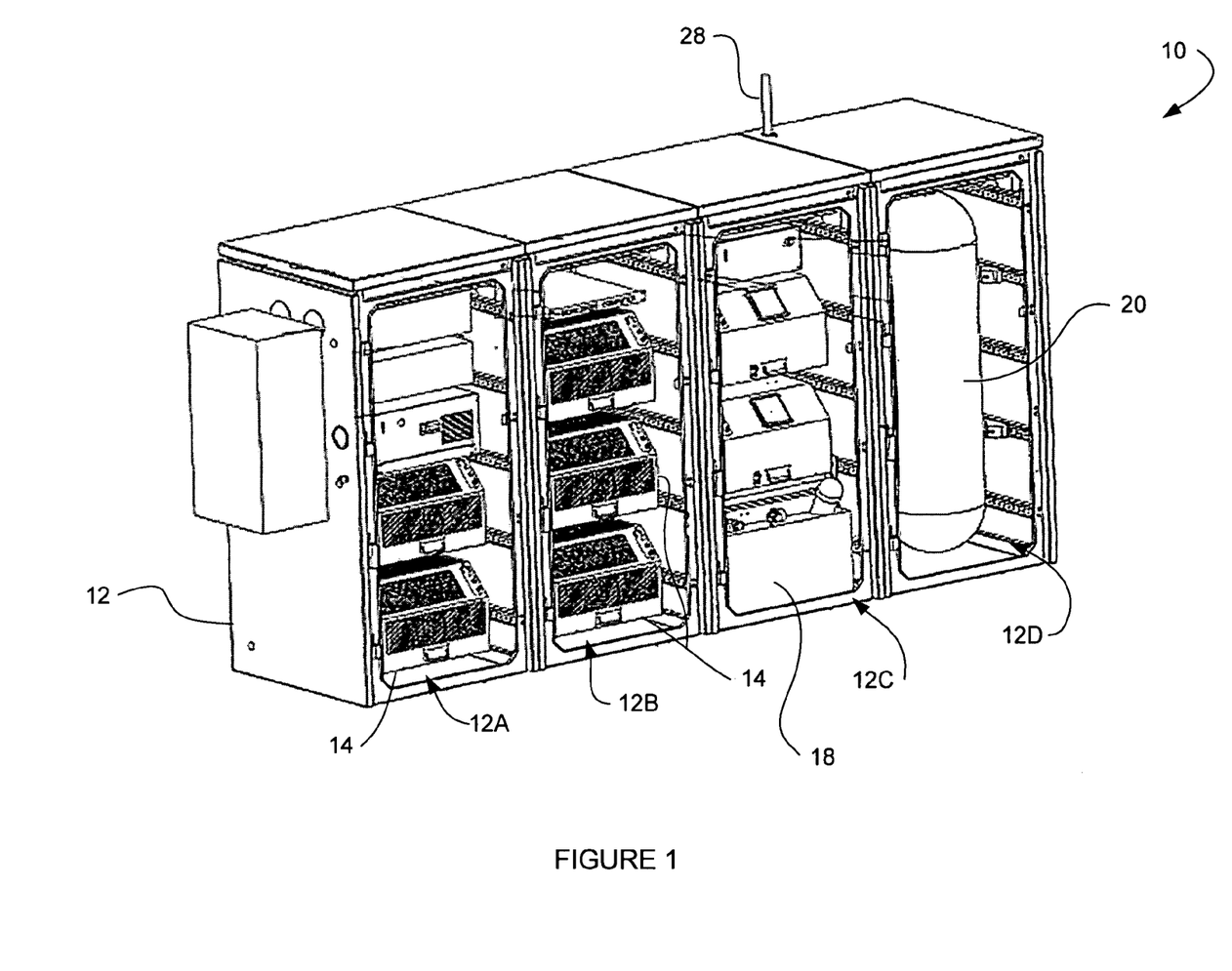
FIG. 1 depicts a perspective view illustrating an exemplary regenerative fuel cell power system for employing an embodiment of the invention.

FIG. 1 is an exemplary embodiment of a regenerative fuel cell power system 10 having a plurality of regenerative electrochemical cell Modular Power Systems (MPS) 12, employing Proton Exchange Membrane (PEM) processes for example, and an Output Power Conditioner (OPC) 24 that provides Power Out 30, which may be ac (alternating current) or dc (direct current) power. In an embodiment, MPS 12 includes an electrolyzer module (ELM) 16, a power module (PWM) 14, a water storage module (WSM) 18, a hydrogen storage module (HSM) 20, and a controller module (CTM) 22. CTM 22 is in operable communication with each power system module 14, 16, 18, 20 via communication bus 32 (represented by dashed lines). Each of the power system modules 14, 16, 18, 20 may be contained within discrete bays 12A, 12B, 12C, 12D. Finally, a ventilation conduit 28 exits the MPS 12 to allow the discharge of hydrogen in the event of a system error.

Figure 2:
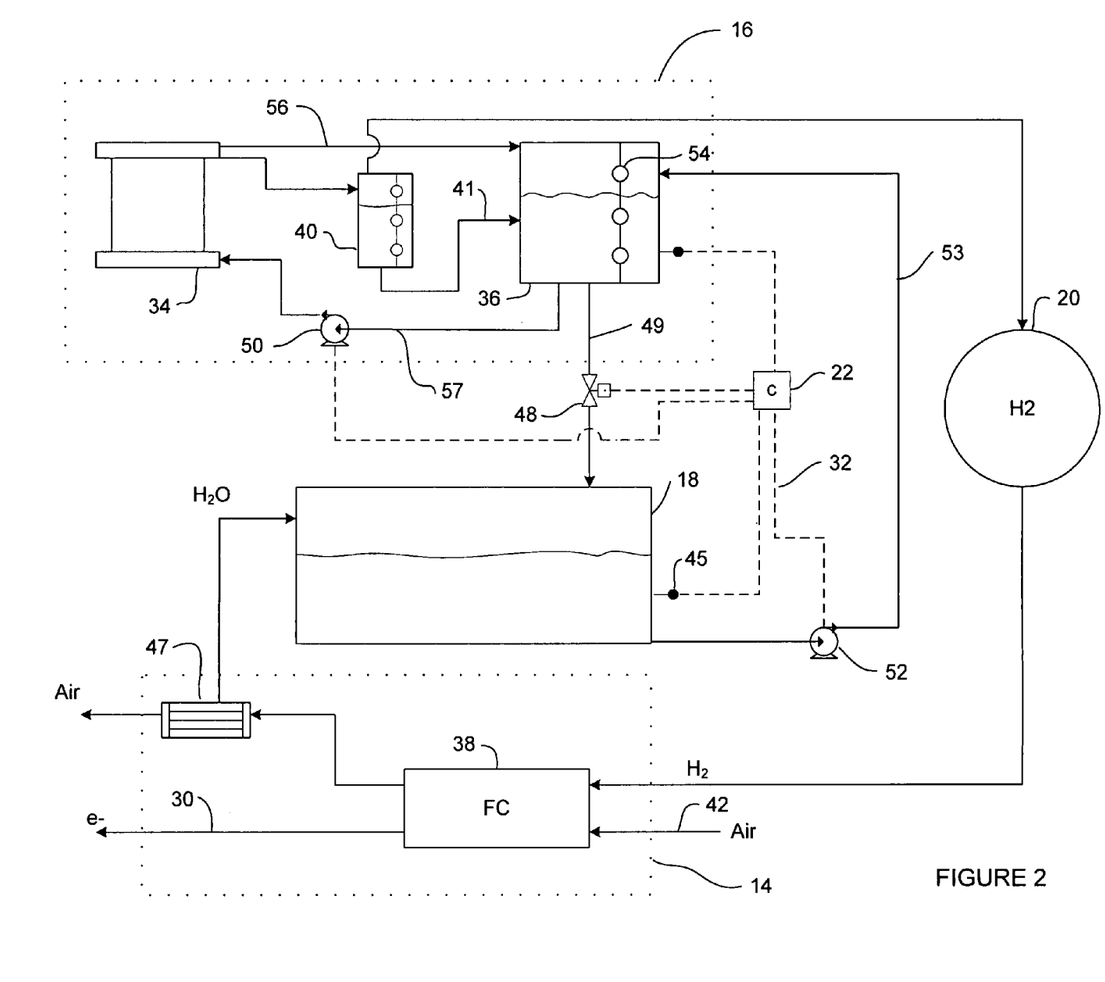
FIG. 2 depicts a schematic representation of an exemplary regenerative electrochemical cell modular power system for use in the system of FIG. 1.

Power system modules 14, 16, 18, 20 are in power and/or fluid communication as is shown in more detail in FIG. 2. The fluid communication and modular arrangement provides more effective utilization of space within the confines of the MPS enclosure 12. In an embodiment, PWM 14 incorporates technology for creating electricity from hydrogen, such as a PEM fuel cell, or a generator (e.g., driven by an internal combustion engine, or the like). As discussed herein, where PWM 14 is configured as a fuel cell, it may also be referred to as a fuel cell module (FCM) 14. A more detailed schematic of MPS 10 is depicted in FIG. 2, which shows ELM 16 having an electrolyzer 34 and phase separator 36, and FCM 14 having an electrochemical fuel cell system 38. Other details relating to MPS 100 and depicted in FIG. 2 will be discussed further below.

Figure 3:
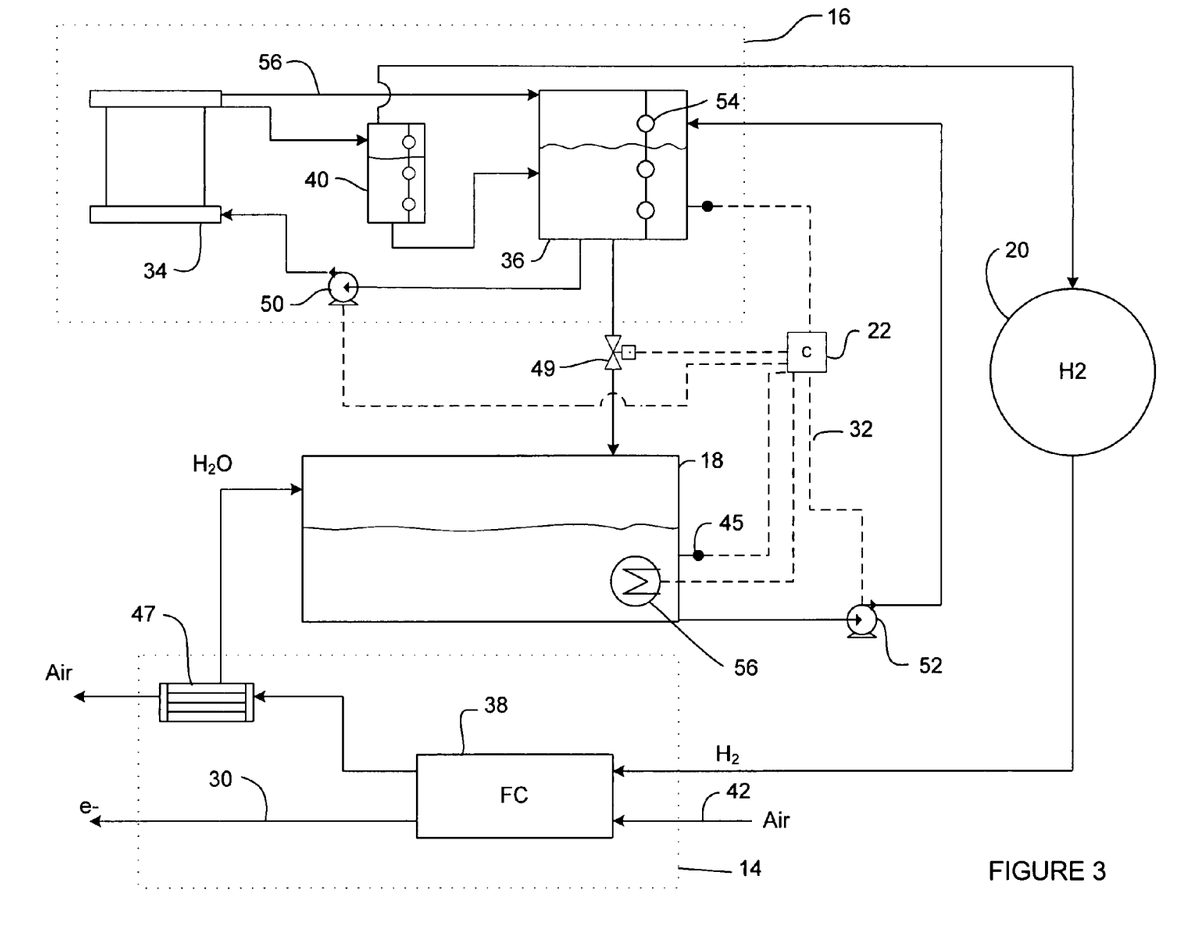
FIG. 3 depicts a schematic representation of an alternate embodiment regenerative fuel cell power system of FIG. 1; and, FIG. 4 depicts an exemplary process for implementing an embodiment of the invention in the system of FIG. 1.

Referring now to FIGS. 2-3, electrochemical energy conversion cells employed in embodiments of ELM 16 and FCM 14 will be discussed. Although embodiments disclosed below are described in relation to an electrochemical power system including a proton exchange membrane electrochemical cell employing hydrogen, oxygen, and water, other types of electrochemical cells and/or electrolytes may be used, including, but not limited to, phosphoric acid and the like. Various reactants can also be used, including, but not limited to, hydrogen, bromine, oxygen, air, chlorine, zinc, sodium borohydride and iodine. Upon the application of different reactants and/or different electrolytes, the flows and reactions change accordingly, as is commonly understood in relation to that particular type of electrochemical cell. Electrochemical cells may be configured as electrolysis cells or fuel cells, as will be discussed below.

Referring now to FIG. 2, an electrochemical cell configured as an electrolysis cell 702, which may be formed in a stack of one or more to form electrolyzer 34 and employed in an embodiment of ELM 16, is depicted in section view having a proton exchange membrane (PEM) 705 arranged between an oxygen electrode (anode) 710 and a hydrogen electrode (cathode) 715. Electrolysis cell 702 functions as a hydrogen generator by electrolytically decomposing process water 720 to produce hydrogen gas 725 and oxygen gas 730. Process water 720 is fed into electrolysis cell 702 at anode 710 to form oxygen gas 730, electrons, and hydrogen ions (protons) 735. The chemical reaction is facilitated by the positive terminal of a power source 740 connected to anode 710 and the negative terminal of power source 740 connected to cathode 715. Power source 740 may be internal or external to ELM 16 and may include a battery or a connection to utility power or a renewable energy source. In an exemplary embodiment, power source 740 is fed by utility power. Oxygen gas 730 and a first portion 745 of the water are discharged from electrolysis cell 702, while protons 735 and a second portion 750 of the water migrate across PEM 705 to cathode 715. At cathode 715, hydrogen gas 725 is removed, generally through a gas delivery line at conduit network 120. The removed hydrogen gas 725 is usable in a myriad of different applications. Second portion 750 of water is also removed from cathode 715.

Figure 5:
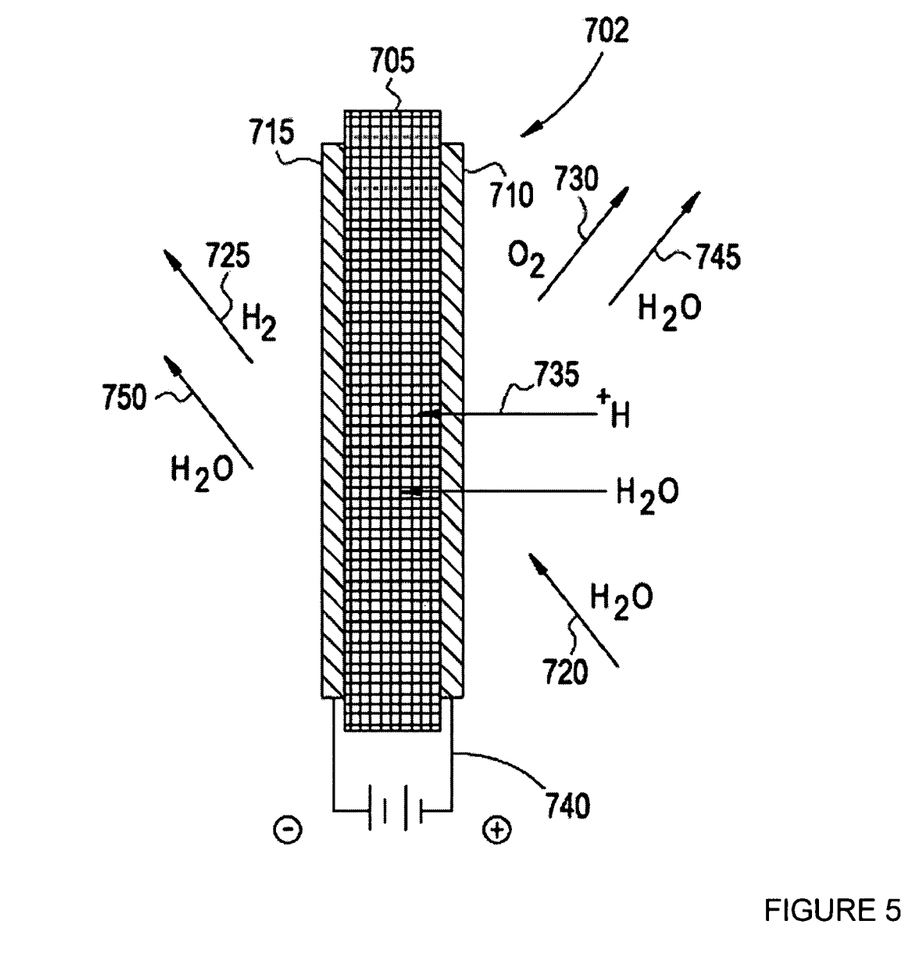

Referring to FIG. 5, ELM 16 may include a number of individual electrolysis cells 702 arranged in a stack with process water 720 being directed through the cells via input and output conduits formed within the stack structure. Electrolysis cells 702 within the stack are sequentially arranged, with each cell 702 having a membrane-electrode assembly (MEA) defined by a proton exchange membrane 705 disposed between a cathode 715 and an anode 710. The cathode 715, anode 710, or both may be gas diffusion electrodes that facilitate gas diffusion to the proton exchange membrane 705. Each membrane-electrode assembly is in fluid communication with flow fields adjacent to the membrane electrode assembly and defined by structures configured to facilitate fluid movement and membrane hydration within each individual electrolysis cell 702.

The water 750 discharged from the cathode side 715 of the electrolysis cell 702, which is entrained with hydrogen gas, may be fed to a phase separator 40 to separate the hydrogen gas 725 from the water 750, thereby increasing the hydrogen gas yield and the overall efficiency of electrolysis cell 702 in general. The removed hydrogen gas 725 may be fed either to a dryer (not shown) for removal of trace water, to HSM 20, which may be a cylinder, a tank, or a similar type of containment vessel, or directly to an application for use as a fuel, such as to FCM 14.

Another type of water electrolysis cell (not shown) that utilizes the same configuration as is shown in FIG. 5 is a cathode feed cell. In the cathode feed cell, process water is fed on the side of the hydrogen electrode. A portion of the water migrates from the cathode across the membrane to the anode. A power source connected across the anode and the cathode facilitates a chemical reaction that generates hydrogen ions and oxygen gas. Excess process water exits the electrolysis cell at the cathode side without passing through the membrane.

A typical fuel cell system 14 (depicted in FIG. 2) also utilizes the same general MEA configuration as the electrochemical cell of FIG. 5, depicted therein as an electrolysis cell. In the fuel cell system 14 configuration, hydrogen gas 725 is introduced to hydrogen electrode 715 (the anode in the fuel cell system 14), while oxygen 730, or an oxygen-containing gas such as air, is introduced to oxygen electrode 710 (the cathode in the fuel cell system 800). The hydrogen gas 725 electrochemically reacts at the anode 715 to produce protons 735 and electrons, the electrons flow from the anode through an electrically connected external load, and the protons 735 migrate through the proton exchange membrane 705 to the cathode 710. At the cathode 710, the protons and electrons react with oxygen 730 to form product water 720.

The general operation of MPS 10 involves the delivery of water from WSM 18 to ELM 16, where the water is electrolyzed to form hydrogen and oxygen gas. The hydrogen gas is dispensed from ELM 16 to HSM 20, from which it is periodically retrieved and dispensed to FCM 14. Once received in FCM 14, the hydrogen gas is reacted with oxygen, from either an air supply 42 or from oxygen production at ELM 16, to produce electrons and water. Power is distributed from MPS 10 by directing the electrons to output power conditioner 24 for subsequent delivery, depicted generally as power out 30, to an attached load (not shown) such as a telecommunications cabinet. Excess or recaptured water along with heat generated by the FCM 14 is returned to WSM 18. The operation and control of MPS 10 and the distribution of power is governed by CTM 22. Local controllers (not shown) and embedded application software are included in the ELMs 16, FCMs 14 and HSM 20 and communicate with the CTM via a databus 32.

In alternative embodiments, CTM 22 may be present and configured as a master control module to serve as a centralized controller with separate local controllers operating to control sub-systems, or may not be present as a separate module, but may have some or all of its functionality embedded within local controllers, thereby providing for a distributed control scheme, or may be present with limited functionality to serve as a signal interface.

The output power, depicted generally as power out 30, may be ac (alternating current) or dc (direct current) power. In alternative embodiments, the output power is provided at about 24 VDC (volts direct current) or about 48 VDC, depending on the market needs, and the input power at PV input 20 and PV interface 30 is provided at about 120/240 VAC (volts alternating current), single-phase, at about 50/60 Hz (Hertz). However, MPS 100 may be designed to operate over a wider range of input voltages, such as from about 85 to about 264 VAC input, for example. An embodiment of MPS 100 has an output current of about 42 amps, with a minimum of about 0 amps and a maximum of about 45 amps, at an output voltage of about 24 VDC +/−0.5 VDC. In an embodiment, MPS 100 has an output voltage that deviates no more than about +/−0.5 VDC in response to an ambient temperature variation from about −40 deg-C. (degrees Celsius) to about +50 deg-C., and can operate at an altitude equal to or less than about 80,000 feet.

In an embodiment and referring to FIG. 2 and FIG. 3, the operational control of power system 10 by CTM 22 and/or local controllers, is assisted by strategically placed sensors 44 throughout power system 10, with sensors 44 referring generally to sensors placed within an operational module to sense the operating characteristics of that particular module, such as the water temperature in phase separator 36. Sensors 44 may be different types of sensors and include but are not limited to temperature sensors, pressure sensors, and voltage sensors. As herein used, the nomenclature for identifying a module temperature sensor is 44, and the nomenclature for identifying an optional system temperature sensor is 45. Other sensors, such as flow meters and ammeters for example, may be employed as appropriate for carrying out the control function herein disclosed.

Also provided within power system 10 are control devices 48, 50, 52 for controlling the flow of power, fluid, gas, coolant, and heat, for example, within and between modules of power system 10, with control devices 50 referring generally to devices placed within an operational module to control an operating characteristic of that particular module, control devices 48 referring generally to valve devices placed to control flow of water from the ELM 16 to WSM 18, and control devices 52 referring generally to pump devices placed to control flow of water from the WSM 18 to ELM 16. Exemplary control devices 48, 50, 52 include but are not limited to pumps, valves, and electrical switches. Other control devices, such as fans, compressors and variacs for example, may be employed as appropriate for carrying out the control function herein disclosed.

In the exemplary embodiment, sensors 44, 45 provide signals from either the phase separator 44 or the WSM 18 indicative of the respective water temperature, with the respective signals being received at common data bus 110. While reference is made herein to FIG. 2 regarding the signal flow and control scheme of power system 10, it will be appreciated that a similar arrangement applies to the modular configuration depicted in FIG. 3 and to any other modular configuration of system modules that may be employed in practicing the teachings of the present invention.

The sensor signals are received from common data bus 32 at a local controller and/or CTM 22, depending on whether a centralized or distributed control scheme is implemented as discussed above, and analyzed for the presence of a condition outside of a predetermined operating range.

Upon receipt of sensor or device information, by continuous polling by CTM 22 and/or local controller, or by continuously monitoring the signal traffic on common data bus 32, for example, a processor accesses operational information in a lookup table in memory to determine whether that particular sensor or device is providing a normal operational reading. The lookup table in memory may be an actual table of values upon which processor performs an interpolation/extrapolation technique, or may be a transfer function upon which processor performs a calculation. In response to processor determining that an abnormal operating condition exists, processor then determines whether an operational adjustment is desirable at one of the control devices at the system module level or at the power system level. An adjustment may be made to either compensate for the abnormal condition, or to accommodate for a malfunctioning device. It should be noted that not all abnormal operating conditions reported by a sensor may warrant an operational adjustment. For example, if a sensor is unhealthy, discussed further below, or if a sensor reading is just outside of an acceptable range, then processor, via the embedded application software, may seek information from other sources to determined whether an operational adjustment should be made. Also, if a sensor is healthy, but reports an abnormal condition, processor may use statistical tools such as trending or control sampling to determine whether an operational adjustment should be made. An abnormal condition may be the result of an anomaly, a data point that is an outlier, or the result of signal noise, in which case the utilization of statistical techniques by processor may avoid unwarranted system adjustments. Other decisions regarding the desirability of an operational adjustment may come from processor accessing a lookup table at memory to determine whether the sensors are sensing operating characteristics, and thereby reporting on operating conditions, that are within an expected range for the existing power condition and fuel consumption of power system 10. In conjunction with the lookup table at memory, processor may employ interpolation or extrapolation techniques, or other algorithms, for comparing sensed operating characteristics to expected operating characteristics at a given system power level. In response to the processor determining that an operational adjustment is desirable, CTM 22 automatically changes the operating state of at least one of a pump 50, 52, valve 48, or any combination thereof, for example, in a direction to compensate for a low water temperature condition. For example, if the water temperature in phase separator 36 in ELM 16 until sensor 54 detects a water level below a predetermined threshold, then CTM 22 may drain water from the phase separator 36 to WSM 18 by opening valve 48. Once the water level in phase separator 36 falls below a predetermined threshold, valve 48 is closed, and pump 52 is activated. Water from WSM 18 is circulated to phase separator 36 allowing the colder water to be replaced by warmer water from WSM 18. When sensor 54 detects that the water level in phase separator 36 has reached a predetermined threshold, CTM 22 terminates operation of pump 52 halting the flow of water from WSM 18 to the phase separator 36. To raise the temperature of electrolyzer 34, CTM 22 initiates operation of pump 50 allowing the circulation of water from the phase separator 36 into electrolyzer 34. The water flows through electrolyzer 34 and returns to the phase separator via conduit 56. In the preferred embodiment, water will be circulated through electrolyzer 34 for a predetermined amount of time. Alternatively, CTM 22 may monitor the water temperature in phase separator 36 and continue the water circulation through pump 50 until the temperature of the return water has stablized indicating that the electrolyzer 34 has reached a temperature equilibrium. In an alternate embodiment, CTM operate either the ELM 16 or the FCM 16 to generate heat within the power system 10 and prevent freezing of components therein.

It should be appreciated that while power system 10 is shown in FIG. 2 and FIG. 3 as having a single ELM 16 and FCM 14, this is for illustrative purposes only. The power system 10 may include a plurality of ELM 16 or FCM 14 depending on the needs of the application.

In another alternative embodiment employing MPS 10 as depicted in FIG. 5 having an immersion heater 56 in WSM 18. a temperature sensor 45 monitors the water temperature in the WSM 18 and provides a signal onto common 32. CTM 22 receives the signal from sensor 45 and compares the value against a predetermined operation range in a look up table. If the temperature in the WSM 18 falls below a predetermined threshold, CTM 22 initiates operation of heater 56 to increase the water temperature. Such additional or supplemental heat may be necessary if the MPS 10 is operated infrequently or if located in an extremely cold environment.

Figure 6:
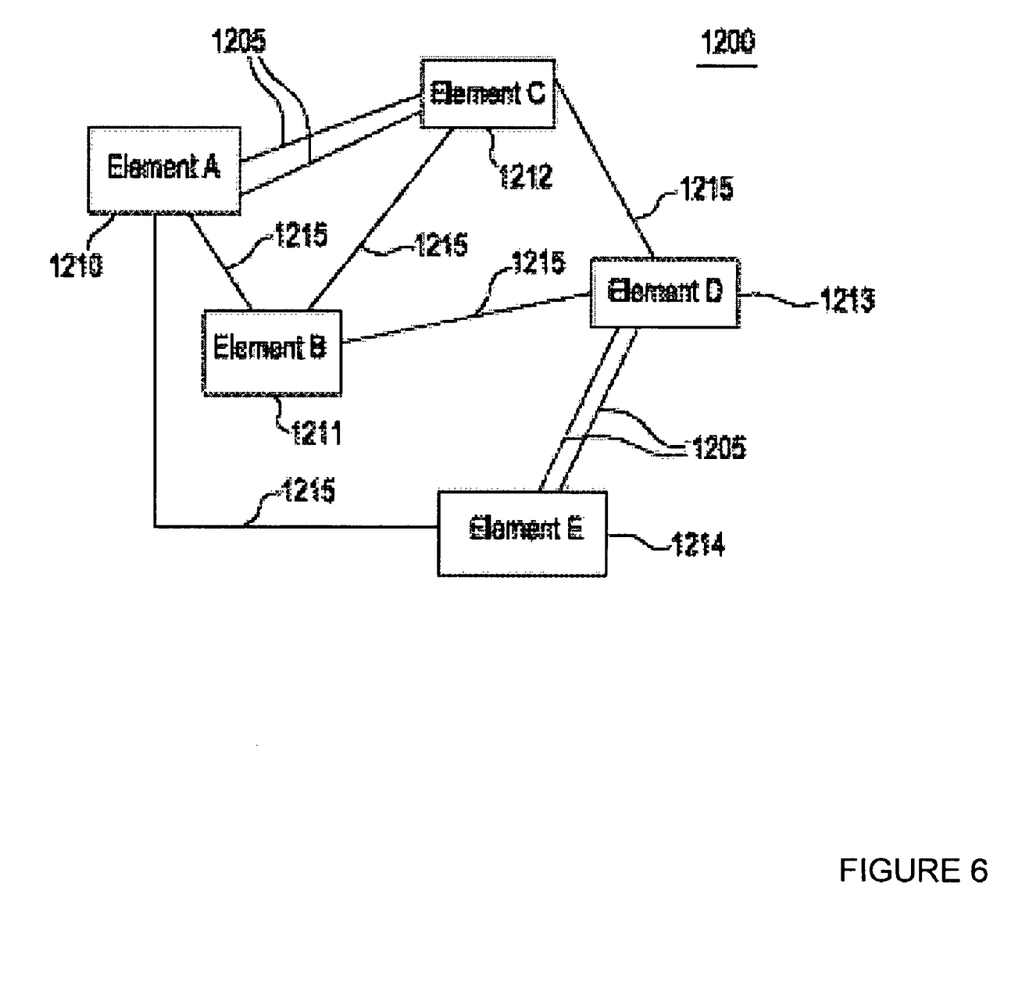

Although a common bus 110 is shown for illustration, power system 10 may be configured using the invention described herein by employing a redundant common bus communications scheme, best seen by now referring to the communications architecture 1200 depicted in FIG. 6. In reference to FIG. 6, elements of power system 10 are depicted generally as Elements A, B, C, D and E, and identified by numerals 1210, 1211, 1212, 1213 and 1214 (1210-1214), respectively, which may refer to any of the aforementioned modules, and interconnecting lines between Elements A, B, C, D and E represent lines of communication. Redundant channels 1205 are represented by double lines, as depicted between Elements A and C, and between Elements D and E, and non-redundant channels (simplex channels) 1215 are represented by single lines. In an embodiment, communication bus 110 may be configured as two or more segmented buses over which data may be transferred between system Elements 1210-1214 in a parallel fashion to facilitate redundancy management. The two or more segmented buses may be composed of redundant channels 1205, simplex channels 1215, or any combination thereof. For example, communication between Element A 1210 and Element E 1214 may occur directly via simplex channel 1215, or indirectly via segmented buses composed of simplex channel 1215 to Element B 1211, simplex channel 1215 to Element D 1213, and redundant common bus 1205 to Element E 1214. Other communication paths will be readily recognized by one skilled in the art. In the preceding example, the utility of a redundant common bus communication scheme is achieved without actually requiring a single bus that is common to all elements, with inter-bus communications being accomplished via a microprocessor or other data translation hardware, firmware and/or software combination. As depicted in FIG. 6, the implementation of the redundant common bus communication scheme may be a combination of simplex and redundant channels arranged in a network between elements to facilitate a packet switching arrangement and ensure message delivery under single or multiple bus failures. In an embodiment, the communication architecture depicted in FIG. 6 may be implemented using a TCP/IP protocol over an Ethernet network.

Figure 4:
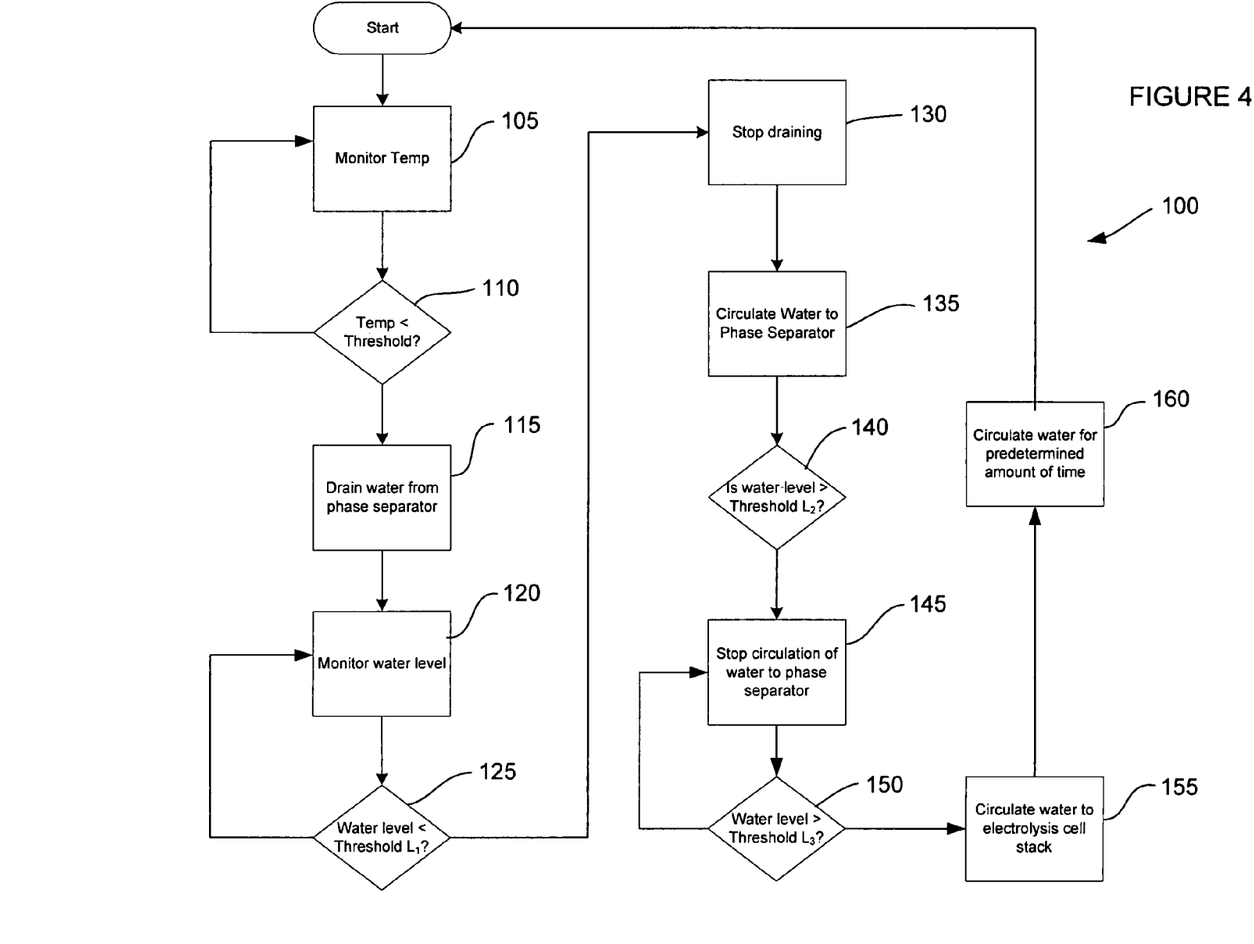

Referring now to FIG. 4, an exemplary process 100 for determining whether an operational adjustment should be carried out by CTM 22 is depicted. Process 100 is depicted as a continuous loop process, indicating a control scheme that continuously monitors signal traffic on common data bus 32. At block 105, CTM 22 monitors sensors 44, 45, 54 to determine the water temperature in the phase separator 36 and WSM 18 and the water level in phase separator 18. The process 100 continues on to block 110 and determines if the temperature of the water in phase separator 36 is below a predetermined threshold, for example 35° F. If the water temperature is not below the predetermined threshold, the process 100 loops back to block 105 and continues to monitor the temperature. If the water is below a predetermined threshold, then control passes to block 115. In block 115, process 100 opens valve 48 allowing water to drain from phase separator 36 into WSM 18. At block 120, process 100 monitors the water level in the phase separator 36 as indicated by sensor 54. The process 100 passes to block 125 where it is determined if the water level in phase separator 36 has fallen below a predetermined threshold. If no, the process 100 loops back to block 120 and continues to monitor the water level. If yes, control passes to block 130 where valve 48 is closed, halting the flow of water from the ELM 16 to the WSM 18. Once the valve 48 is closed, process 100 in block 135 initiates operation of pump 52 causing water to be circulated from the WSM 18 back to the phase separator 36 in ELM 16. As the water circulates, process 100 monitors the water level in phase separator 36 in block 145. In block 150, process 100 determines if the water level in phase separator 36 is above a predetermined threshold. If no, the process 100 loops back to block 145 and continues to monitor the water level. If yes, control passes to block 155 where operation of pump 52 is discontinued and pump 50 is initiates. Process 100 continues to circulate water through the electrolysis stack 34 for a predetermined amount of time before looping back to block 105. In an alternate embodiment, process 100 monitors the temperature of the water returning from the electrolysis stack 34 and continues the water circulation until the difference between the temperature of the water going to the electrolyzer 34 and the return water is below a threshold.

Some embodiments of the invention may include some of the following advantages: autonomous thermal management; no or very low maintenance; built in safeguards; system segmentation through modularity of design; centralized or distributed control arrangements; data recording and reporting on demand; and scaleable system through modularity of design.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of thermal management in a regenerative fuel cell system comprising:
operating a fuel cell; producing electricity, water and heat from said operation of said fuel cell;
storing said water and heat in a container; sensing the temperature of water in a phase separator;
automatically draining water from said phase separator into said container if said temperature is below a first predetermined threshold;
determining the water level in said phase separator; and,
increasing the temperature of water in the phase separator by automatically circulating water and heat from said container to said phase separator when said water level is below a second predetermined threshold; and
automatically circulating water through said electrolysis stack when said water level in said phase separator is above a third predetermined threshold; and
monitoring the temperature of the water returning from the electrolysis cell stack; and, circulating water from said phase separator through said electrolysis cell stack until the difference between the temperature of the water going to said electrolysis cell stack and the return water is below a fourth threshold.

2. The method of thermal management in a regenerative fuel cell system further comprising the step of stopping the draining of said phase separator when the water level in said phase separator is below said second predetermined threshold.

3. The method of thermal management in a regenerative fuel cell system of claim 2 wherein said water is circulated through said electrolysis cell stack for a predetermined period of time.

4. The method of thermal management in a regenerative fuel cell system of claim 3 further comprising the step of stopping the circulation of water from said container to said phase separator when said water level is above a fifth predetermined threshold.

5. A method of thermal management in a regenerative fuel cell system comprising:
producing electricity, water and heat from said operation of said fuel cell;

storing said water and heat from said fuel cell in a container;

determining a first temperature of said water in a phase separator;

automatically draining water from said phase separator into said container if said first temperature is below a first predetermined threshold;

determining the water level in said phase separator; and, increasing said water in said phase separator to a second temperature by automatically circulating said stored water and heat from said container to said phase separator when said water level is below a second predetermined threshold; and automatically circulating water from said phase separator through said electrolysis stack when said water level in said phase separator is above a third predetermined threshold and said first temperature is below said first predetermined threshold.

monitoring a third temperature of said water circulating to said electrolysis stack;

monitoring a fourth temperature of said water returning from said electrolysis stack; and, circulating said water from said phase separator through said electrolysis stack until a difference between said third temperature and said fourth temperature is below a fourth predetermined threshold.

6. The method of claim 5 further comprising stopping the draining of said phase separator when a water level in said phase separator is below said second predetermined threshold.

7. The method of claim 6 wherein said draining of water from said phase separator includes an automatic opening of a valve coupled to said phase separator.

8. The method of claim 7 wherein said increasing of said water to said second temperature includes operating a pump to circulate said water and heat from said container.

9. The method of claim 5 wherein said water is circulated through said electrolysis cell stack for a predetermined period of time.

10. The method of claim 5 further comprising the step of stopping the circulation of water from said container to said phase separator when said water level is above a fifth predetermined threshold.

* * * * *